United States Patent [19]

Green

[11] 3,816,702

[45] June 11, 1974

[54] ELECTRONIC ISOTHERMAL DEVICE

[76] Inventor: Robert E. Green, 1105 E. Oxford, Santa Ana, Calif. 92707

[22] Filed: June 26, 1972

[21] Appl. No.: 266,280

[52] U.S. Cl. .................. 219/413, 219/209, 219/406, 219/408, 219/410, 219/494, 219/501, 219/510, 219/543

[51] Int. Cl. .......................................... F27d 11/02

[58] Field of Search ........... 219/209, 210, 345, 390, 219/406, 407, 408, 413, 522, 543, 410, 494, 501, 510

[56] References Cited

UNITED STATES PATENTS

| | | | |
|---|---|---|---|
| 2,603,740 | 7/1952 | Del Buttero | 219/543 X |
| 2,678,990 | 5/1954 | Quirk | 219/406 |
| 2,859,321 | 11/1958 | Garaway | 219/543 X |
| 3,108,170 | 10/1963 | Murphy | 219/543 X |
| 3,118,042 | 1/1964 | Parker | 219/406 |
| 3,158,821 | 11/1964 | Sulzer | 219/210 X |
| 3,176,116 | 3/1965 | Lighter | 219/345 |
| 3,201,621 | 8/1965 | Milner | 219/210 X |
| 3,258,323 | 6/1966 | Kirk | 219/385 X |
| 3,296,577 | 1/1967 | Travis et al. | 339/275 |
| 3,299,253 | 1/1967 | Lawson, Jr. | 219/385 |
| 3,376,405 | 4/1968 | Gower | 219/385 |
| 3,662,150 | 1/1971 | Hartung | 219/209 |

*Primary Examiner*—Volodmyr Y. Mayewsky

[57] ABSTRACT

An electronic isothermal device capable of maintaining relatively even temperatures within a given container comprising an electronic circuit and a series of unique heaters in series therewith.

The container is formed as a box having interior side walls made from boards such as printed circuits having a layer of conductive strands such as solder thereon positioned in a substantially uniform pattern. The boards forming side walls of the container are utilized as heating elements and are controlled by an electronic circuit comprising a series of discrete components or an integrated circuit in series therewith.

The control circuit which can be placed on the circuit boards comprises an amplifier with a pair of transistors respectively connected to a thermistor and a resistor which serve to control a silicone controlled rectifier (SCR). The SCR controls a flow of current through the circuit boards for heating purposes when the thermistor registers changes in ambient temperature.

10 Claims, 9 Drawing Figures

ELECTRONIC ISOTHERMAL DEVICE

BACKGROUND OF THE INVENTION

1. Field of the Invention

The field of this invention lies in the heating and temperature control art within containers providing a relatively even temperature.

2. The Prior Art

This invention is related to the prior art which serves to provide electronic "ovens" for discrete electronic components, and incubators for bacteriological specimens. The invention is also directed toward the general art of maintaining a substantially even temperature or isothermal condition within a given container.

The art, directed toward bacteriological incubation devices, incorporates incubators having discrete heaters in various configurations. The temperature of such incubators is controlled by thermostatic control, as well as other suitable means so that the interior of the container can be maintained in a substantially isothermal condition. However, as can be appreciated, when a discrete temperature sensing device, having one particular heater, is incorporated in a container, the control of temperature throughout the container cannot be effectively and uniformly regulated.

Many incubators utilize single heating strips, or resistance elements to heat an entire device. In such cases, isothermal effectiveness cannot be maintained because of the different air currents and convections causing variances within the thermal air layers of the container.

In some electronic circuits it is desirable to maintain electronic components at specific temperatures to effectuate optimum operation. Containers used therefor are often called "ovens," but are of substantially an ineffective design for maintaining even temperatures. Temperature control containers for electronic components can be used to maintain optimum operating conditions of crystals, as well as other semi-conductor devices that respond to temperature changes with different performance characteristics.

Some prior art temperature control of electronic elements has required air conditioned units as well as internal temperature control devices, such as heaters. Such devices do not incorporate a unitized wall structure and control circuit as this invention does, to optimize the configuration of the container as well as the control circuit.

The prior art incorporates electronic component heating containers that have wires wrapped around a tubular member. The wires wrapped around the tubular member serve as heating elements and effectuate the control of the interior of the tubular member. However, the heating elements are extrinsic to the outside configuration. Thus, when additional heat is required to maintain the interior temperature of the tubular member, there exists a substantial amount of latent heat within the tubular material. This latent heat continues to flow into the interior of the tube and actually elevates the temperature beyond that required.

The ends of the tubular members containing the electronic components that are to be maintained in an isothermal condition are generally only closed off with a non-thermal controlling means. In this invention, the entire container can be surrounded so that the heat is exactly proportionate to that required in response to the sensing means which determines what the heat of the interior of the container should be.

This invention provides an electronically temperature controlled container such as an incubator, or electronic component isothermal maintenance container such as an "oven." The container has its own control circuit built therein. Specifically, the isothermal control circuit is mounted on a circuit board which forms a portion of the heating elements of this invention. The circuit boards can be connected electrically in series with the control circuit. The conductive surfaces on the printed circuit boards provide a means for heating the surrounding ambient air at a temperature consistent with the required temperature.

The heating elements as previously alluded to are formed as strands on circuit boards such as those conductive surfaces of printed circuit boards with solder thereon. Thus, the solder strands in effect form the heating elements. The solder strands of the printed circuit boards are in a substantially uniform array to provide a uniform heating pattern across the face of the circuit board. Each printed circuit board can be utilized as a sidewall of the container which is to provide the isothermal conditions of the invention.

Thus, this invention comprises a compact series of temperature regulating elements in the form of printed circuit boards with an integrated control circuit mounted thereon.

SUMMARY OF THE INVENTION

In summation, this invention provides a container having side walls and a control circuit mounted therein formed from a labyrinth of conductive elements such as solder strands on a printed circuit board. The solder strands provide the heating elements for isothermal temperature control of the container.

More specifically, this invention provides an isothermal container having side walls formed with an electrical labyrinth of paths to provide the conduction of electricity for heating purposes. The conduction of electricity for heating purposes is controlled by an integrally mounted control circuit which can be formed as part of a circuit board which provides the conductive heating elements. The control circuit can be placed in electrical series with other conductive heating elements on other circuit boards to completely surround an interior portion of the container, thereby providing substantially isothermal conditions therein.

The control circuit has an amplifier comprising a pair of transistors with the bases thereof controlled respectively by a thermistor and a resistance such as a resistor. However, the thermistor can be replaced by conductors intermingled with the heating elements for more uniform control. The resistively controlled transistor allows a flow of current to an SCR when the thermistor controlled transistor is not allowing current to flow. The SCR is in series with the heating elements and effectuates operation of the heating elements when current flows therethrough.

BRIEF DESCRIPTION OF THE DRAWINGS

The invention will be more clearly understood by reference to the description, taken in conjunction with the accompanying drawings wherein.

DESCRIPTION OF THE PREFERRED EMBODIMENTS

A General Configuration

Figures 1, 2, 3, 4, 5, 9:
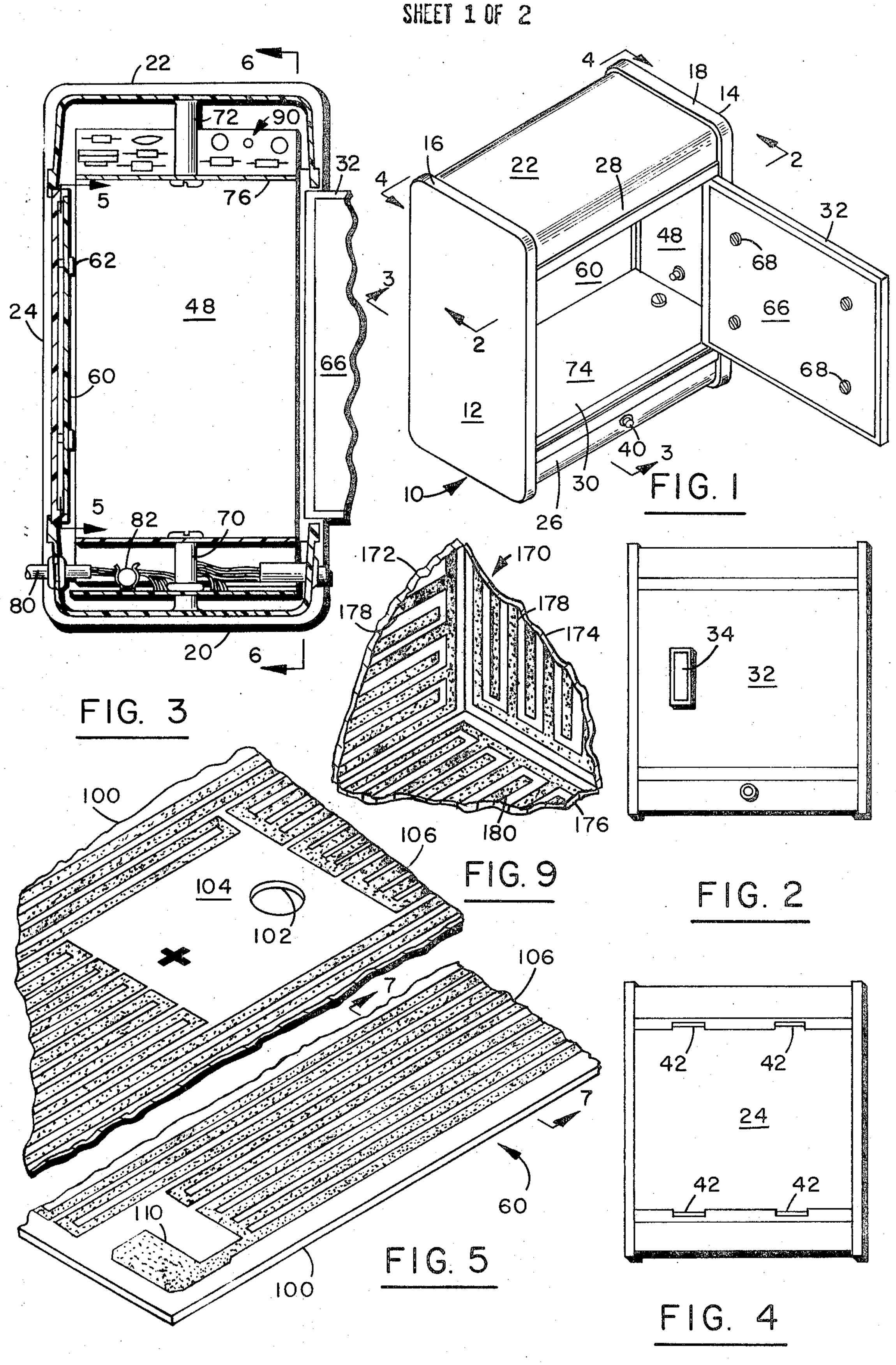
FIG. 1 shows a perspective view of an isothermal container of this invention, such as an incubator.
FIG. 2 shows an elevation view of the container shown in FIG. 1 along lines 2—2 thereof.
FIG. 3 shows a partially fragmented sectional view along lines 3—3 of FIG. 1.
FIG. 4 shows a rear elevation view of the container shown in FIG. 1 along lines 4—4 thereof.
FIG. 5 shows a fragmented portion of an interior panel of the container shown in FIG. 1 along lines 5—5 of FIG. 3.

An illustrative embodiment of this invention has been incorporated in a bacteriological incubator 10, having a series of side walls 12 and 14. Side walls 12 and 14 have respective flanges 16 and 18. A bottom wall 20 and top wall 22 are placed interiorly with respect to the flanges 16 and 18. The flanges 16 and 18 extend around the periphery of the box and form a ridge. The container 10 also has a back wall 24 and a partial lower front wall 26 and a partial upper front wall 28 which serve to provide an entrance opening 30 into which a door 32 closes. The door 32 has a handle 34 for providing a gripping means for ingress and egress to the interior of the container 10.

An indicator light 40 is provided to show that the device is on. The light 40 can be of any suitable configuration and connected to the circuit as will be described for emplacement within the lower front panel 26.

The back side of the incubator, namely the back wall 24, has a series of openings 42 leading into the interior of the container 10.

A series of printed circuit boards are attached to the interior of the walls of the incubator with their respective conductive surfaces interfacing the walls. Specifically, circuit boards 46 and 48 are attached to the respective side walls by any suitable means such as the projections 50 and 52 for the support of each board. The projections 50 and 52 can be molded into the side walls 12 and 14 of the container. In this manner, the boards 46 and 48 can be implaced thereover and locked thereto by gromets 54 and 56 which serve to secure the boards in place, proximate the side walls 12 and 14.

A circuit board 60 is attached to the rear wall 24 by means of screws 62 which thread into screw seats formed as projections 64 from the back wall 24. The door 32 can also be provided with a heating element in the form of a printed circuit board 66 and attached to the front door 32 by means of screws 68.

In like manner, a top and bottom circuit board having conductive heating elements can be attached to the container by upstanding projections 70 and 72 for respectively attaching boards 74 and 76 thereto. The boards 74 and 76 can be provided with heating elements depending upon the degree of control that is desired within the incubator. However, in many applications, there is a sufficient rise of heat to effectuate heating of the top thermal layers, thereby eliminating the need for heating elements in the top board 76.

A cord 80 is seen leading into the base of the container. The cord 80 can be provided with a plug 81 for plugging into any normal electrical outlet such as the 110 volt outlets provided by most power companies in most buildings. The cord 80 or power source, can be connected to the circuit in series with a fuse 82. The circuit boards form the interior side walls of the container 10 and constitute circuit boards 46, 48, 60, 66, 76 and 74, and are in electrical series. The cord 80 also leads to a control circuit which will be described in detail with respect to FIG. 8.

A series of discrete components are shown mounted on a circuit board 48 in the area generally described as 90 of that printed circuit board. The discrete components are in series on the printed circuit board with the other printed circuit boards, namely boards 46, 48, 60, 66, 74 and 76. The components generally located at 90 are detailed within the schematic showing of FIG. 8 which will be expanded upon.

Description of the Heating Elements

Figures 6, 7, 8:
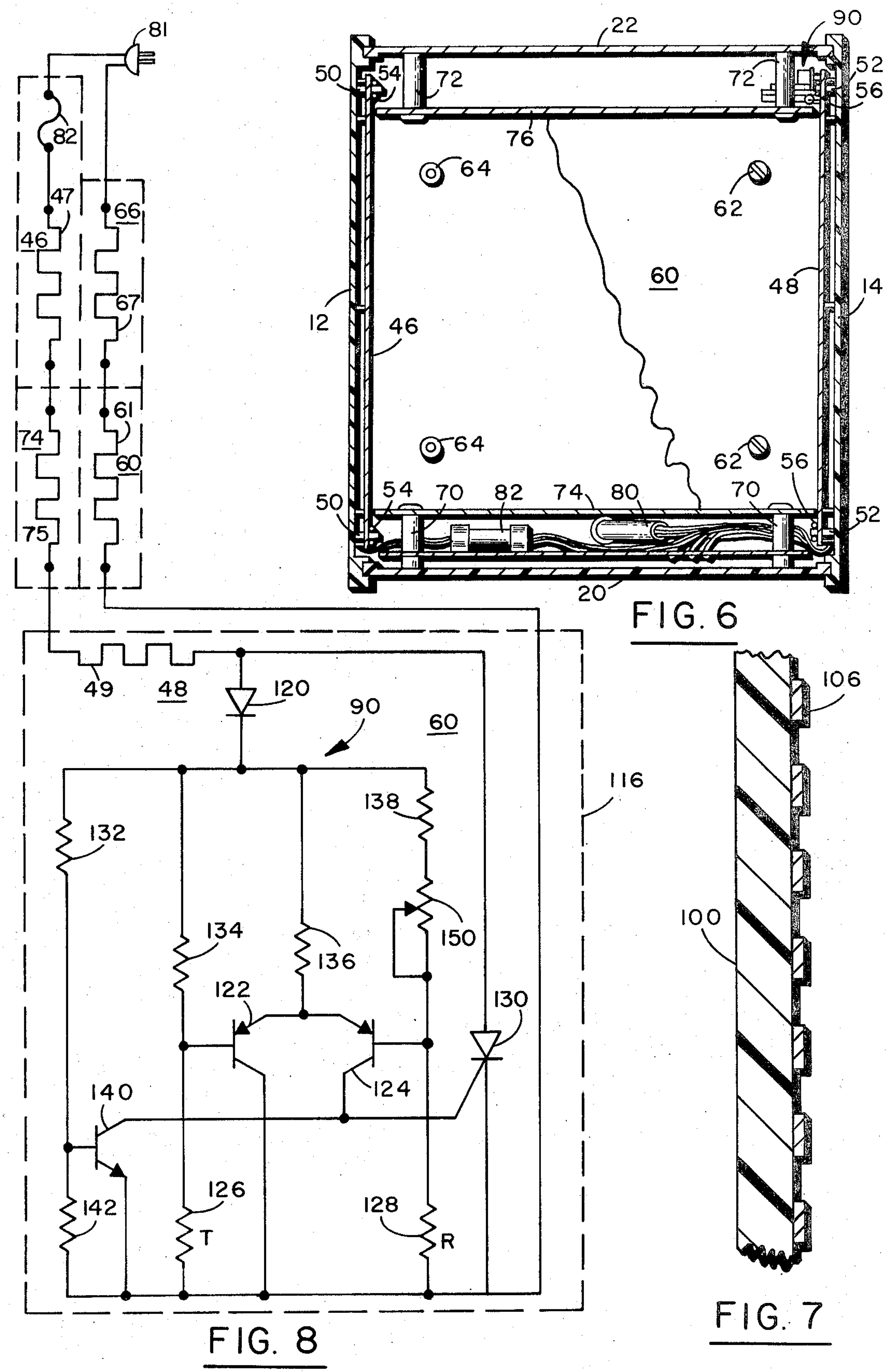
FIG. 6 shows a sectional view along lines 6—6 of FIG. 3 with a portion of the back panel thereof broken away.
FIG. 7 shows a detailed sectional view of the board shown in FIG. 5 along lines 7—7 thereof.
FIG. 8 shows a schematic view of the circuit providing the heating means and control means of this invention; and, FIG. 9 shows a fragmented perspective view of an electronic component oven having inter-related resistance control strands.

Looking more specifically at FIGS. 5 and 7, a printed circuit board of the type forming the interior walls 46, 48, 60, 66, 76 and 74 is shown. The showing of FIG. 5, of course, is a fragmented detailed showing of the boards.

The boards, as generally shown in FIG. 5, comprise a plastic substrate 100 which can be suitably formed as a planar plastic sheet. The planar plastic sheet as is common in many circuit boards, can be formed from a fiberglass reinforced plastic for stiffness, or can be merely a plastic sheet having suitable dialectric properties to support a plurality of conductors. Furthermore, the board can be of the copper clad type for ease in applying conductors thereto.

The substrate 100 is shown having an opening 102 for receipt of the screw 62. The screw 62, as previously stated, threads through the opening 102 and is seated within the screw seat 64 of the board 60. The surrounding area 104 of the opening 102 is generally of a nonconductive nature so that the elements on the board will not ground out.

The board 60 has a series of metallic conductors 106 which can be formed by standard solder deposition techniques. Vapor deposition may be utilized for applying the conductor 106 to the surface of the substrate 100. In addition to vapor deposition and standard solder techniques, silk screen processes, plating, vacuum deposition, and sputtering can be utilized.

A uniform placement of the conductive strips or strands 106 is generally desired in order to maintain a uniform isothermal condition in the container. As can be seen, the coverage of the interior surfaces with the heating elements in a substantially uniform manner maintains the interior surfaces' temperature in an even manner. This helps to provide a substantially isothermal condition throughout the interior without substantial latent heat being built up within the side walls of the container 10. By eliminating the heat buildup within the side walls of the container 10, a substantial degreee of effective temperature control response is obtained.

Looking at FIG. 5, a shorted area 110 is seen formed from the conductive material. The shorted area 110 is to account for areas where the corners of the interior panels meet so that there is not an excess amount of heat generated at the corners for purposes of maintaining an isothermal condition.

As can be understood, different configurations of the conductive material 106 can be applied, depending upon the character of the isothermal conditions required. In other words, if certain isothermal conditions cannot be maintained unless more heat is applied within a certain area, the density of conductive strands 106 can be increased in those areas. Furthermore, various geometric configurations can be utilized to compensate for isothermal conditions that vary because of convection and other continuous thermal current changes. In such cases, adequate compensation can be made by either increasing or decreasing the density of conductive strands with respect to the geometric configuration of the interior of the container.

In FIG. 9, a showing is made of an isothermal box or "oven" having a series of components 170 therein. The components can be in series with the conductive strands. The isothermal box is comprised of panels 172, 174 and 176 which have been fragmented. The panels have a series of conductors 178 or strands similar to those conductors shown in FIGS. 5 and 7 and labeled 106. It should also be noted that the conductors 178 are interwoven with conductors 180 which are conductive materials and shall be described in operation with regard to the alternative embodiment of the control circuit. Specifically, conductors 180 can be utilized as resistance control members in the control circuit.

Control Circuit

Looking more specifically at FIG. 8 in conjunction with the remaining figures, a control circuit schematic is shown. The circuit boards 46, 60, 66, and 76 have heating elements 47, 49, 61, 67 and 75 which correspond to the conductive surfaces or strands 106 on each one of the respective boards. The heating elements 47, 49, 61, 66 and 75 need only be in series with the control circuit which has generally been blocked out within the dotted framework 116. The dotted framework 116 generally represents the components 90 which have been shown within the interior of the container 10.

The electrical circuit comprises means for delivering a 110 volt supply or for that matter, any other suitable supply voltage, depending upon the values of the control circuit. The connection means can be in the form of a plug 81. The plug 81 can be plugged into any common wall socket. Within the circuit, a fuse 82 is placed to protect the entire device. As has been previously alluded to, it does not matter where the remainder of the control circuit 116 is, as long as it is in series with the heater elements 47, 49, 61, 66 and 75.

As a matter of reference, the heater element 49 is a portion of the circuit board 60 which is utilized to form a portion of the interior surface of the container. In order to control the 60 cycle impulses and provide only a positive half cycle, a diode 120 is connected in the control circuit. The diode 120 allows current to pass to the remainder of the control circuit only on the positive half cycle.

Looking more particularly at the relevant portions of the circuit, an amplifier can be seen in the form of two transistors 122, and 124. The transistors 122 and 124 comprise a pair of pnp transistors. The pnp transistors 122 and 124 are respectively connected to a thermistor 126 and a resistor 128 which is conveniently labeled for identification purposes not only numerically but also with a T and an R. The thermistor 126 and the resistor 128 as can be appreciated, control the bases of the respective pnp transistors 122 and 124. The control of the transistor bases is effectively utilized as will be explained in the operation of the invention.

A silicone controlled rectifier 130 (SCR) is utilized to control the heating elements 47, 49, 61, 67 and 75 in response to the overall operation of the control circuit as will be explained.

In order to properly bias the active components of the circuit, resistances 134 and 136 and 138 are provided. The resistances create the electronic biasing required for operation of the invention.

A transistor 140 which is biased by a resistor 132 and 142 is implaced within the circuit for purposes of preventing the SCR 130 from turning on above 15 volts zero crossing. The reason for preventing the turning on of the SCR is due to the fact that such high voltages create noise. When the units are placed in juxtaposition to each other, the noise might create a cross linking which will unnecessarily turn on the SCR 130.

A variable resistance 150 is provided which can be in the form of a potentiometer, or any other suitable variable resistance to increase or decrease the sensitivity of the circuit. The sensitivity of the circuit of course, increases or decreases the temperature at which the thermistor 126 will operate, thus varying the ranges of isothermal conditions.

A substitution can be made for the thermistor 126 by incorporating other suitable resistances. For instance, interwoven wires 180 can be placed with the conductors 178 which can be formed of strands in the same manner and form as the conductors 106. In this manner, the interwoven conductors 180 can be substituted for the thermistor 126. The conductors 180 can operate to control the entire environment surrounding the isothermal area as will be explained.

In such an embodiment where the thermistor 126 is substituted by conductive elements 180, it should be noted that the conductive elements have a positive temperature coefficient. In other words, in contradistinction to the thermistor, the conductive elements or strands 180 become less conductive upon heating.

Thus, from the foregoing, it is seen that the control circuit of FIG. 8 must be modified for operation of the isothermal container of FIG. 9. In such a case, the thermistor 126 is substituted by an appropriate resistance to properly bias the base of transistor 122. Resistance 128 is substituted by emplacing the conductive elements 180 therefor. This effectively causes operation of the control circuit to maintain generally isothermal conditions, assuming that the substituted resistance and conductive resistance elements 180 are properly balanced with the remainder of the circuit.

The entire resistive elements 180 of this embodiment operate as a thermal resistance unit so that when the heat increases, the current flow is resisted and as a consequence, transistor 122 will turn on, effectuating the operation of the invention. The interwoven wires 180 can serve to provide a more uniform exposure to the temperatures to be controlled. This causes a more sensitive control to create a substantially uniform isothermal area around the interior walls 172, 174 and 176 of the isothermal unit shown in FIG. 9.

Operation of the Invention

In operation, the invention is placed in an area where it is to maintain an isothermal condition. The material to be maintained in an isothermal condition is placed within the container. In the first embodiment showing an incubator, the material would be bacteriological specimens. In instances where an isothermal condition is to be maintained within a container surrounding electronic components or an "oven," the power supply can be provided by the power to the electronic system.

The isothermal temperature condition is maintained on a pre-established basis by adjusting the variable resistance 150 to the adjustment required for operation of the device at the desired temperature.

When the power supply is being delivered to the control circuit which is in series with the heating elements 47, 49, 61, 66 and 75, the device is ready for operation. At this point, the respective transistors 122 and 124 will be either in a conductive or non-conductive mode.

As an aside, the thermistor 126 exhibits the characteristics of being more conductive upon an increase in temperature. In other words, the thermistor 126 has a negative temperature coefficient. Thus, when the thermistor 126 increases in temperature, or is just above the desired temperature, its resistance goes down so that the transistor 122 will turn on. This is due to the fact that the base of the pnp transistor 122 is negatively biased, allowing the flow of current to the common point or ground. Thus, in this mode, the heating elements 47, 49, 61, 67 and 75 are not being supplied with current.

When the temperature is below the operative temperature of the thermistor 126, the flow will proceed through the other leg of the bridge. In other words, the transistor 124 turns on when the thermistor resistance 126 is in excess of that of resistor 128. In this case, the current flows through the other leg of the bridge, namely through transistor 124. As can be appreciated, when current flows through transistor 124, it effectively operates the gate of the SCR 130 to allow current to flow therethrough.

The character of the thermistor 126 and the resitance 128 are quire critical. This is due to the fact that the thermistor 126 and resistor 128 create a respective on or off function and must be balanced with respect to the heating capacity of the unit. The same criticality applies when conductive elements 180 replace the resistor 128 and a resistor replaces thermistor 126.

As previously explained, a transistor 140 is provided and biased by a resistance 132 and 142. This effectively prevents the SCR from turning on above a certain voltage of zero crossing, which in this case is 15 volts. The prevention of the circuit from turning on at extremely high voltages, prevents noise between units in adjacent relationship. This prevents each one respectively from turning on or off in response to voltages above the 15 volts zero crossing.

When this invention is utilized for an electronic "oven" such as those utilized to control electronic component temperatures, the power supply can be from any suitable source inherent within the entire device. In other words, the entire container 10 can be formulated into a smaller area such as a 1 or 2 inch cubicle having a series of conductive surfaces therein formed from the printed circuit boards that in part operate the components that are to have an isothermal condition. For instance, the components can be mounted on one of the printed circuit boards as is shown in this particular invention and the surrounding area can be utilized as an isothermal unit for controlling the temperature of the components therein.

It should be understood that this invention can be utilized in all sorts of printed circuit boards having electrical conductors thereon for maintaining isothermal conditions. Thus, this invention is only to be read in light of the following claims, as far as the scope and spirit hereof. As can be appreciated, other alternative embodiments within the teachings of this invention can be incorporated by those skilled in the art without departing from the scope and spirit of this invention.

I claim:

1. A container for creating a generally isothermal condition therein comprising:

a plurality of plastic non-conductive boards formed into walls of a container having side, top, bottom, and back walls and an excess closure;

a plurality of electrical conductors deposited and adhered on a majority of said non-conductive boards in the manner of printed circuit boards and thermally exposed to provide heating of the general interior area where an isothermal condition is to be maintained;

an electrical resistance means enclosed within the walls of said container responsive to temperature changes in said container for controlling the current flowing through said conductors; and, changing means for causing changes in electrical current flow upon changes of resistance in said resistance means.

2. The container as claimed in claim 1 wherein said conductors comprise:

solder which has been disposed on said boards.

3. The container as claimed in claim 1 further comprising:

conductive material which has been disposed on said boards in a continuous manner by a metallic thin film deposition process.

4. The container as claimed in claim 1 wherein said resistance means comprise:

a thermistor.

5. The container as claimed in claim 4 further comprising:

a first and second transistor wherein said first transistor has its base connected to said thermistor;

a resistance connected to the base of said second transistor;

a silicone controlled rectifier having its gate connected to said second transistor for purposes of causing current to flow through said silicone controlled rectifier when said second transistor turns on; and, means to connect said silicone controlled rectifier to said conductors.

6. The container as claimed in claim 5 further comprising:

a third transistor connected to said second transistor and said silicone controlled rectifier and biased to limit the voltage to said silicone controlled rectifier.

7. The container as claimed in claim 6 further comprising:

means to connect said unit to an alternating current; and, a diode to cause said unit to operate on a particular cycle of said alternating current.

8. The container as claimed in claim 7 further comprising:

variable resistance adjustment means for changing the effective operational characteristics of said thermistor.

9. The container as claimed in claim 1 wherein:

said conductors are in series with each other and said resistance means.

10. The container as claimed in claim 1 wherein said resistance means comprises:

a second series of conductors on said boards responsive to temperature changes within said container for controlling the flow of current through said first conductive strands.

* * * * *